United States Patent
Hiertz et al.

(10) Patent No.: US 10,827,524 B2
(45) Date of Patent: Nov. 3, 2020

(54) METHOD OF DECENTRALIZED MEDIUM ACCESS CONTROL IN A COMMUNICATIONS NETWORK

(75) Inventors: Guido Hiertz, Cologne (DE); Rajesh Shantaram Bagul, Ulhasnagar (IN); Olaf Wischhusen, Aachen (DE); Jörg Habetha, Aachen (DE); Klaus Peter May, Aachen (DE)

(73) Assignees: Koninklijke Philips N.V., Eindhoven (NL); Philips Lighting Holding B.V., Eindhoven (NL)

( * ) Notice: Subject to any disclaimer, the term of this patent is extended or adjusted under 35 U.S.C. 154(b) by 1633 days.

(21) Appl. No.: 10/561,457

(22) PCT Filed: Jun. 22, 2004

(86) PCT No.: PCT/IB2004/050956
§ 371 (c)(1),
(2), (4) Date: Jan. 10, 2008

(87) PCT Pub. No.: WO2004/114598
PCT Pub. Date: Dec. 29, 2004

(65) Prior Publication Data
US 2008/0130622 A1 Jun. 5, 2008

(30) Foreign Application Priority Data
Jun. 25, 2003 (EP) .................................. 03101876

(51) Int. Cl.
*H04W 74/08* (2009.01)
*H04L 12/407* (2006.01)
*H04W 84/18* (2009.01)

(52) U.S. Cl.
CPC ....... *H04W 74/0816* (2013.01); *H04L 12/407* (2013.01); *H04W 84/18* (2013.01)

(58) Field of Classification Search
CPC . H04W 28/26; H04W 74/0816; H04W 72/04; H04W 74/0833; H04W 16/14;
(Continued)

(56) References Cited

U.S. PATENT DOCUMENTS 5,231,634 A * 7/1993 Giles et al. ................... 370/348
5,499,243 A  3/1996 Hall
(Continued)

FOREIGN PATENT DOCUMENTS

WO   WO9501020 A1   6/1994
WO   WO0128170 A2   4/2001
(Continued)

OTHER PUBLICATIONS

Bharghavan V. et al., "MACAW: A Media Access Protocol for Wireless LAN's", Computer Communication Review, Association. for Computing Machinery, NY, vol. 24, No. 4, Oct. 1, 1994, pp. 212-225, XP000477053.

(Continued)

*Primary Examiner* — Allahyar Kasraian

(57) ABSTRACT

A method of decentralized medium access control in a communications network consisting of a plurality of stations, wherein a sending station transmits a reservation request for a future transmission to an intended receiving station, said intended receiving station being in a reception range of said sending station, said reservation request signalling reservation information including starting point and duration of the transmission, defining a time period of said future transmission, and, in case of a multi-channel system, frequency or code of the channel of said future transmission, so establishing a reservation, and stations active in said reception range overhear said reservation request and other stations than said intended receiving station perform the actions of storing said reservation information locally and (Continued)

Figure 1:
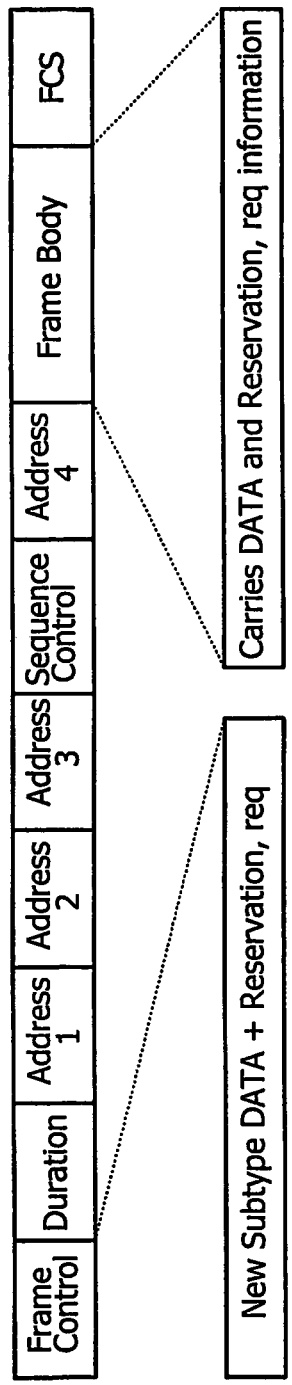

defer from medium access during the time period and on the channel of the future transmission.

23 Claims, 2 Drawing Sheets

(58) Field of Classification Search
CPC ......... H04W 72/0446; H04W 74/0808; H04W 84/18; H04W 72/02; H04W 72/0406; H04W 76/27; H04L 12/413; H04L 12/407
USPC .......................................................... 370/348
See application file for complete search history.

(56) References Cited

U.S. PATENT DOCUMENTS

| | | | |
|---|---|---|---|
| 5,633,911 A * | 5/1997 | Han et al. ..................... | 455/464 |
| 5,734,898 A * | 3/1998 | He ................................. | 707/203 |
| 5,787,080 A | 7/1998 | Hulyalkar | |
| 5,960,001 A * | 9/1999 | Shaffer et al. ................. | 370/448 |
| 6,034,967 A * | 3/2000 | Citta ........................ | H04B 3/38 |
| | | | 348/E7.07 |
| 6,192,053 B1 | 2/2001 | Angelico | |
| 6,198,728 B1 * | 3/2001 | Hulyalkar .......... | H04Q 11/0478 |
| | | | 370/280 |
| 6,345,043 B1 | 2/2002 | Hsu | |
| 6,404,756 B1 * | 6/2002 | Whitehill et al. ............. | 370/338 |
| 6,704,932 B1 * | 3/2004 | Matsunaga et al. .......... | 725/126 |
| 6,850,504 B1 * | 2/2005 | Cao ................... | H04W 72/0413 |
| | | | 370/335 |
| 7,433,691 B1 * | 10/2008 | White ........................... | 455/445 |
| 2002/0133589 A1 | 9/2002 | Gubbi | |
| 2002/0163933 A1 | 11/2002 | Benveniste | |
| 2002/0172167 A1 | 11/2002 | Kim | |

FOREIGN PATENT DOCUMENTS

| | | |
|---|---|---|
| WO | WO0221769 A2 | 3/2002 |
| WO | WO2004114598 A1 | 12/2004 |

OTHER PUBLICATIONS

Weinmiller J. et al., "Analyzing and Improving the IEEE 802. 11—MAC Protocol for Wireless LAN's", Modeling, Analysis, and Simulation of Computer and Telecommunication Systems, 1996, Mascots '96, Proceedings of the Fourth Int'l Workshop on San Jose, CA, IEEE Computer Society, Feb. 1, 1996, pp. 200-206, XP010161831.

* cited by examiner

METHOD OF DECENTRALIZED MEDIUM ACCESS CONTROL IN A COMMUNICATIONS NETWORK

The invention relates to a method of decentralized medium access control in a communications network consisting of a plurality of stations.

Wireless local area networks (WLANs) based on Institute of Electronics and Electrical Engineering (IEEE) 802.11 constantly conquer new markets, the home user market being the most important of them all. Despite WLANs in business use, a home WLAN will not offer-infrastructure for the network. Therefore, all centralized support for Quality of Service (QoS) is of lower importance than in the business network. A decentralized support for QoS is needed.

In decentralized WLANs, no co-ordination instance can reserve the wireless medium for time bounded services. Co-ordination functions as the EDCF of 802.11e work on a probability driven basis, such that there is still the possibility of collisions on the wireless medium, not only between traffic derived from sources of the same priority, but also from different priorities. These collisions reduce the throughput as they generate overhead and increase the delay. For periodic real time traffic like VoIP it may even be unacceptable to tolerate this delay.

To the satisfaction of the home user, a new co-ordination function regarding multihop connections is needed. It shall combine multihop capability with the support for Quality of Service. Existing co-ordination functions for 802.11 are not useful for multihop connections, since they are designed for single hop connections only.

Therefore it is the object of the invention to overcome the disadvantages of the standard 802.11 collision avoidances and to propose a method of decentralized medium access control to reserve the wireless medium to the needs of Quality of Service applications.

This object is solved by a method as defined in claim 1 and a communications network as defined in claim 13.

According to the invention, a method of decentralized medium access control in a communications network consisting of a plurality of stations offers that a sending station transmits a reservation request for a future transmission to an intended receiving station, said intended station being in a reception range of said sending station, said reservation request signalling reservation information including starting point and duration of the transmission, defining a time period of said future transmission, and, in case of a multi-channel system, frequency or code of the channel of said future transmission, so establishing a reservation, and stations active in said reception range overhear said reservation request and other stations than said intended receiving station perform the actions of storing said reservation information locally and defer from medium access during the time period and on the channel of the future transmission.

The invention foresees that stations which are planning a data transmission, announce the starting point in time, duration of the transmission and eventually even the frequency or code channel in a reservation packet. This reservation packet is overheard by the other stations in the reception range of the sending station of the reservation request. The other stations store this information and defer from any medium access at the announced point in time on the respective frequency code channel and for the duration of the planned transmission.

In a preferred embodiment, said intended receiving station acknowledges said reservation request by returning a message repeating said reservation information, and other stations than the intended receiving station active in the reception range for transmissions of said receiving station perform the actions of storing said reservation information locally and defer from medium access during the time period and on the channel of the future transmission upon overhearing said acknowledgement message. Thereby, in order to clear the medium also on the receiver side, the reservation packet is sent back by the intended receiving station, when it is received from the sending station. By these means, the other stations in the reception range of the intended receiving station are informed about the planned transmission of the sending station and can also defer from any medium access during the announced period.

The overhead of the reservation mechanism can be reduced by transmitting the reservation request piggy-back to normal data frames. Also said acknowledgement message can be transmitted piggy-back in an acknowledgement frame of a data packet or another data packet.

In a further preferred embodiment, the reservation request includes information on the priority or priority class of the future transmission, said priority information being used in that active stations in said reception range of said sending station replace an existing reservation information stored for the respective time period by new reservation information of a most recently received reservation request, if the existing reservation request has a lower priority than the most recently received reservation request; and the station that has been previously allocated the channel for the respective time period withdraws or delays its future transmission, if the most recently received reservation has a higher priority.

Also, when the acknowledgement message includes information on the priority or priority class of the future transmission, the priority information is used in that active stations in the reception range of that receiving station replace an existing reservation information as explained above.

According to the decentralized nature of the new protocol different reservations may overlap or stations may wish to transmit at the same time. Therefore, a reservation collision resolvance algorithm is needed. Each station which desires to reserve an interval is to check existent reservation entries in its local table. As each reservation belongs to a certain priority, the station checks the priority of its own reservation request against the colliding reservation. If it has lower priority, the station has to defer its reservation request. This step may be repeated until a slot is found which fits the desired length of the stations own reservation duration. In case of reservation requests of the same priority, the older reservation request may be given higher priority.

In a preferred embodiment, several periodic transmissions can be signalled by a single reservation request, and a time period derived from reservation information of a reservation request of a first future transmission being interpreted as period also of the following future transmissions and stations active in the reception range overhear said reservation request and other stations than said intended receiving station perform the actions of storing said reservation information locally and defer from medium access during all signalled time periods on all respective channels of the future transmissions.

The signalled starting point of the future transmission can be defined relatively to the beginning or end of the sending time or the beginning or end of the time slot of said reservation request, so that no global synchronization of clocks is required. Correspondingly, when the starting point of the future transmission signalled in the acknowledgement message will be defined relatively to the beginning or end of the sending time or the beginning or end of the time slot as a time base of said acknowledgement message, the starting point information from the sending station is adapted to the time base of said acknowledgement message.

Collisions of reservation requests can be resolved by a collision resolution mechanism, for example, a reservation request of shorter duration of transmission can replace an existing reservation of longer duration of transmission, or reservation information of a most recent reservation request replaces an existing reservation, if the most recent reservation request has an earlier due time than the existing information.

If a reservation request is to be revoked, the sending station transmits a revocation message to said intended receiving station for the purpose of deleting one or several of its reservation requests; and stations active in the reception range for transmissions of said sending station overhear said revocation message and other stations than said intended receiving station locally delete the corresponding reservation information. The intended receiving station can then acknowledge said revocation message by returning a message repeating said revocation information; and other stations than the intended receiving station active in the reception range for transmissions of said receiving station perform the actions of locally deleting the reservation information corresponding to the revocation information.

It may also be provided that a station broadcasts a copy of its locally stored reservation information; and stations active in the reception range for transmissions of said station compare the received reservation information with their locally stored information and add missing reservations to their locally stored reservation information.

The invention also relates to a communications network consisting of a plurality of stations, wherein the method as described herein is used.

Figure 2:
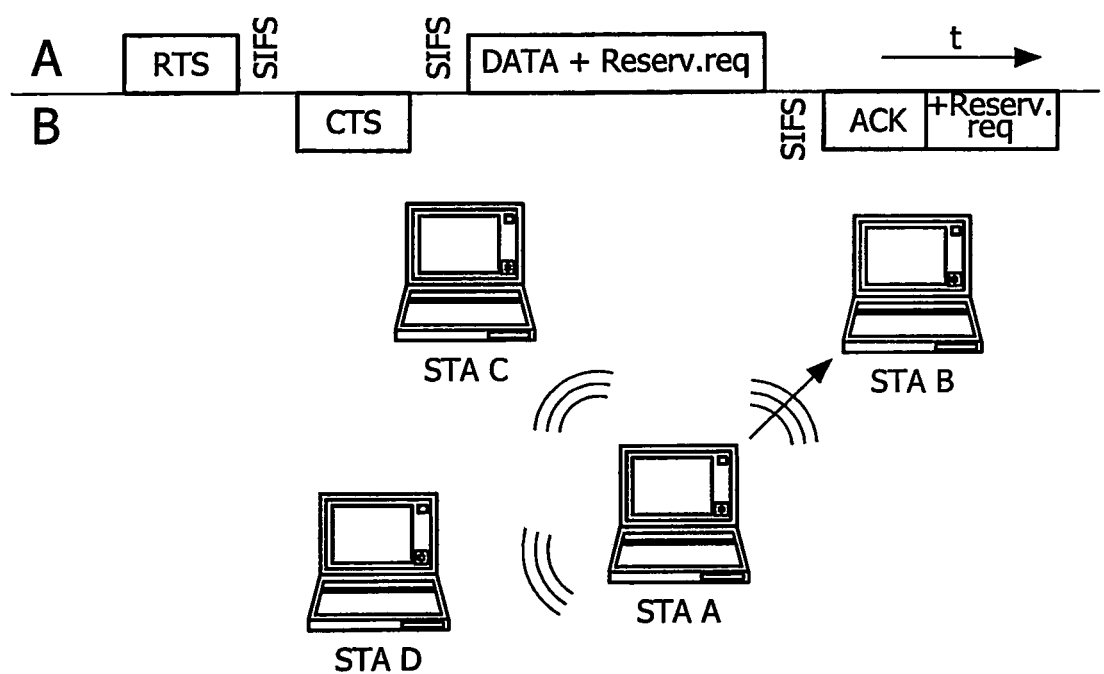

The invention will be further explained in detail with reference to the accompanying drawings, wherein FIG. 1 shows an example how the distributed reservation can be embedded in the frame structure of the IEEE 802.11 system; and FIG. 2 shows an example of the data frame exchange including a reservation request.

In FIG. 1, the reservation information is included in the frame body. Alternatively, the reservation information could also be included in the frame header. The reservation information consists of the following fields: —period of the traffic, —duration of the medium reservation, —priority of data transmission, —number of future reservation periods.

The period of the traffic informs other stations when the next frame will be transmitted. The duration field informs other stations about the duration of the next data transmission of this stream, including time for the acknowledgement message. The priority field includes information about the traffic category this stream belongs to. By designating the priority of the future transmission, it is possible to support different Quality of Service levels in the network. In case that two transmissions are planned for the same time period, the higher priority traffic will gain the medium access and the lower priority sending station will automatically withdraw or delay its reservation.

An optional field informs other stations about the number of future reservation periods to be made. This allows a station to make a periodic reservation by a single reservation packet. The period between two transmissions is given in the "period of traffic" field, and the constant duration of each transmission in the "duration of the medium reservation" field.

As shown in FIG. 2, station (STA) A transmits a frame to station B. The data frame also includes a reservation request. Station C and station D overhear this data transmission and copy the reservation request information. Thus they can set up a table of reservation requests. As already mentioned above, the receiving station will optionally repeat the reservation information in its acknowledgement message for the purpose of dealing with the hidden station problem. This acknowledgement message can be received by stations which are hidden to the sender and therefore might interfere during the reserved duration as they are in the reception range of the receiver but out of the reception range of the sending station.

With every overheard or received reservation request, every station updates its internal reservation request table, includes the most recently received reservation requests and eventually replaces an already stored reservation in case that the new reservation has a higher priority.

As different stations may independently chose different reservation periods and reservation duration, a collision avoidance mechanism is needed. First of all, the priority of the reservation request has to be considered. Stations requesting a reservation for a lower priority stream delay to higher priority streams. Stations requesting a reservation of the same priority may chose strategies like "shortest job first" or "first come, first serve" for collision avoidance. Conflicting reservation requests which partially overlap shall be reordered in the most efficient way. This may lead to increased delays for low priority streams, which must not delay VoIP frames etc. If still a reservation conflict occurs, the oldest reservation request shall be prioritised. New arriving reservation requests may not rule out old reservation requests.

Especially when every reservation request reserve only its succeeding frame, a revocation procedure for reservation requests is not generally needed. In case a large number reservation requests is made in advance, the next requested reservation may be used to transmit a revocation frame for the purpose of deleting reservation requests in other stations tables.

In addition to the reservation requests scheme described above, stations may also transmit their reservation request table in every beacon frame they generate. As all stations of an Independent Basic Service Set (IBSS) participate in the generation of a beacon frame, the station which generates the beacon frame may also transmit its local reservation request table inside the beacon to achieve a better synchronization of the reservation request table of all stations. This may also help to achieve a coherent reservation request table between partial overlapping Basic Service Sets (BSS).

According to the invention, using the reservation information, every station of the BSS can predict transmissions from neighbouring stations and refrain from channel access at the desired time. For the support of time bounded services, the protocol shall optionally allow a BSS wide etiquette that stations are not allowed to start any own transmission if the during of their own transmission does not end before the beginning of the reservation. Therefore, the requested reservation will be safe from any delay. If this strict behaviour, which might decrease overall throughput, is not desired, the station which requested the reservation will become a 1-persistent station. It has highest priority then, as it will start its own transmission immediately after the ongoing transmission.

The invention avoids time consuming, delay increasing and throughput decreasing collisions on the wireless medium. Especially multihop connections will benefit from the protocol as it makes it possible to schedule transmissions and to behave more intelligent than just drawing a random number in trying to transmit after a random period. The benefit is the distribution of transmission intentions of neighbouring stations. This allows to further enhance the protocol by extensions which make use of the fact that the time of a future transmission is known.

The invention claimed is:

1. A method of decentralized medium access control in a communications network consisting of a plurality of stations, wherein a sending station transmits a reservation request for a future transmission to an intended receiving station, the intended receiving station being in a reception range for transmissions of the sending station, the method comprising:
    operating under a protocol by the plurality of stations, wherein the protocol provides that a reservation for the future transmission is established when the reservation request is transmitted;
    transmitting, by the sending station, the reservation request piggy-back in a normal data frame, the reservation request including a starting point and a duration of the future transmission to define a time period of the future transmission;
    when the plurality of stations belong to a multi-channel system, including, by the sending station, a frequency or code of the channel of the future transmission in the reservation information;
    overhearing, by stations active in the reception range, the reservation request for transmissions of the sending station;
    storing, by stations other than the intended receiving station, the reservation information of the already established reservation locally based on the reservation request;
    deferring, by the stations other than the intended receiving station, from medium access during the time period and on the channel of the future transmission; and
    including, by the sending station, the reservation request in a frame body or frame header of a data frame.

2. The method of claim 1, wherein the reservation request includes information on a priority or priority class of the future transmission, the priority information being used in that active stations in the reception range of the sending station replace an existing reservation information stored for the time period by new reservation information of a most recently received reservation request, when the existing reservation request has a lower priority than the most recently received reservation request; and
    the station that has been previously allocated the channel for the time period withdraws or delays its future transmission, when the most recently received reservation has a higher priority.

3. The method of claim 1, wherein an acknowledgement message includes information on a priority or priority class of the future transmission, the priority information being used in that active stations in the reception range of the intended receiving station replace an existing reservation information stored for the time period by new reservation information of a most recently received reservation request, when the existing reservation request has a lower priority than the most recently received reservation request; and
    that station that has been previously allocated the channel for the time period withdraws or delays its future transmission, when the most recently received reservation has a higher priority.

4. The method of claim 1, further comprising:
    signaling several periodic transmissions by a single reservation request and a time period derived from reservation information of a reservation request of a first future transmission being interpreted as a period also of the following future transmissions;
    overhearing, by stations active in the reception range, the reservation request;
    storing, by stations other than the intended receiving station, the reservation information locally; and
    deferring, by stations other than the intended receiving station, from medium access during all signaled time periods on all respective channels of the future transmissions.

5. The method of claim 1, wherein the signaled starting point of the future transmission is defined relative to a specific point in time associated with the reservation request message so that no global synchronization of clocks is required.

6. The method of claim 1, wherein a specific point in time, which serves as reference point for the definition of the starting time of the future transmission, is defined relative to the beginning of the reservation request message and signaled inside the reservation request message.

7. The method of claim 1, wherein the starting point of the future transmission signaled in the acknowledgement message is defined relative to the beginning or end of the sending time or the beginning or end of the time slot as a time base of the acknowledgement message, and the method further comprises adapting starting point information from the sending station to the time base of the acknowledgement message.

8. The method of claim 1, wherein collisions of reservation requests are resolved by a collision resolution mechanism.

9. The method of claim 1, wherein a reservation request of shorter duration of transmission replaces an existing reservation of longer duration of transmission.

10. The method of claim 1, wherein reservation information of a most recent reservation request replaces an existing reservation when the most recent reservation request has an earlier due time than the existing information.

11. The method of claim 1, further comprising:
    transmitting, by the sending station, a revocation message to the intended receiving station for the purpose of deleting one or several reservation requests;
    overhearing, by stations active in the reception range for transmissions of the sending station, the revocation message; and
    locally deleting, by stations other than the intended receiving station, the corresponding reservation information.

12. The method of claim 11, further comprising:
    acknowledging, by the intended receiving station, the revocation message by returning a message repeating the revocation information; and
    locally deleting, by stations other than the intended receiving station active in the reception range for transmissions of the intended receiving station, the reservation information corresponding to the revocation information.

13. The method of claim 1, further comprising:
    broadcasting, by a station, a copy of its locally stored reservation information in every beacon frame;
    comparing, by stations active in the reception range for transmissions of the station, the received reservation information with their locally stored information; and adding, by stations active in the reception range for transmissions of the station, missing reservations to their locally stored reservation information.

14. The method of claim 1, further comprising:
acknowledging, by the intended receiving station, the reservation request by returning an acknowledgement message repeating the reservation information of the already established reservation;
storing, by stations other than the intended receiving station active in a reception range for transmissions of the intended receiving station, the reservation information of the already established reservation locally based on the acknowledgement message; and
deferring, by stations other than the intended receiving station active in a reception range for transmissions of the intended receiving station, from medium access during the time period and on the channel of the future transmission upon overhearing the acknowledgement message.

15. A communications network consisting of a plurality of stations, comprising:
a sending station configured to transmit a reservation request for a future transmission piggy-back in a normal data frame, wherein the sending station is configured to operate under a protocol which provides that a reservation for the future transmission is established when the reservation request is transmitted;
an intended receiving station in a reception range for transmissions of the sending station configured to operate under the protocol and receive the reservation request to establish a reservation, wherein the reservation request signaling reservation information includes a starting point and duration of the transmission to define a time period of the future transmission, and, when the plurality of stations belong to a multi-channel system, then the sending station is further configured to include a frequency or code of the channel of the future transmission in the reservation information; and
stations, other than the intended receiving station, configured to operate under the protocol and active in the reception range for transmissions of the sending station, the stations being further configured to overhear the reservation request and store the reservation information of the already established reservation locally based on the reservation request and deferring from medium access during the time period and on the channel of the future transmission,
wherein the reservation request is transmitted by including the reservation request in a frame body or frame header of a data frame.

16. The communications network of claim 15, wherein the reservation request includes information on a priority or priority class of the future transmission such that active stations in the reception range of the sending station replace an existing reservation information stored for the time period by new reservation information of a most recently received reservation request, when the existing reservation request has a lower priority than the most recently received reservation request; and
the station that has been previously allocated the channel for the time period is configured to withdraw or delay future transmission, when the most recently received reservation has a higher priority.

17. The communications network of claim 15, wherein an acknowledgement message includes information on a priority or priority class of the future transmission such that active stations in the reception range of the intended receiving station replace an existing reservation information stored for the time period by new reservation information of a most recently received reservation request, when the existing reservation request has a lower priority than the most recently received reservation request; and
the station that has been previously allocated the channel for the time period is configured to withdraw or delay future transmission, when the most recently received reservation has a higher priority.

18. The communications network of claim 15, wherein several periodic transmissions are signaled by a single reservation request wherein a time period derived from reservation information of a reservation request of a first future transmission being interpreted as period also of the following future transmissions, and stations active in the reception range are configured to overhear the reservation request and stations other than the intended receiving station are configured to perform the actions of storing the reservation information locally and defer from medium access during all signaled time periods on all respective channels of the future transmissions.

19. The communications network of claim 15, wherein the sending station is configured to transmit a revocation message to the intended receiving station for the purpose of deleting one or several of its reservation requests; and
stations active in the reception range for transmissions of the sending station are configured to overhear the revocation message and stations other than the intended receiving station are configured to locally delete the corresponding reservation information.

20. The communications network of claim 19, wherein the intended receiving station is configured to acknowledge the revocation message by returning a message repeating the revocation information; and
stations other than the intended receiving station active in the reception range for transmissions of the intended receiving station are configured to locally delete the reservation information corresponding to the revocation information.

21. The communications network of claim 15, wherein a station is configured to broadcast a copy of its locally stored reservation information in every beacon frame; and
stations active in the reception range for transmissions of the station are configured to compare the received reservation information with their locally stored information and add missing reservations to their locally stored reservation information.

22. The communications network of claim 15, wherein the intended receiving station is configured to acknowledge the reservation request by returning an acknowledgement message repeating the reservation information of the already established reservation; and
stations other than the intended receiving station active in a reception range for transmissions of the intended receiving station are configured to store the reservation information of the already established reservation locally based on the acknowledgement message and defer from medium access during the time period and on the channel of the future transmission upon overhearing the acknowledgement message.

23. A station, comprising a processor and a memory, the station, operating under a protocol, transmits a reservation request for a future transmission piggy-back in a normal time frame to an intended receiving station operating under the protocol, wherein the protocol provides that a reservation for the future transmission is established when the reservation request is transmitted, the reservation request comprising signaling reservation information including a starting point and duration of the transmission, defining a time period of the future transmission, and, when the station belongs to a multi-channel system, wherein the station is further configured to include frequency or code of the channel of the future transmission in the reservation information, the reservation request causing stations, operating under the protocol, other than the intended receiving station in a reception range for transmissions of the station configured to transmit the reservation request, to overhear the reservation request to store the reservation information of the already established reservation locally based on the reservation request and defer from medium access during the time period and on the channel of the future transmission, wherein the reservation request is transmitted by including the reservation request in a frame body or frame header of a data frame.

\* \* \* \* \*